(12) United States Patent
Morris et al.

(10) Patent No.: US 7,356,387 B2
(45) Date of Patent: Apr. 8, 2008

(54) APPARATUS AND METHODS FOR INTERACTIVELY DISPLAYING INFORMATION RELATING TO A VEHICLE

(75) Inventors: Steven E. Morris, Fair Haven, MI (US); William A. Sheere, III, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 754 days.

(21) Appl. No.: 10/809,058

(22) Filed: Mar. 25, 2004

(65) Prior Publication Data

US 2005/0216458 A1    Sep. 29, 2005

(51) Int. Cl.
*G06F 7/00* (2006.01)
(52) U.S. Cl. .............................. 701/1; 701/29; 340/438
(58) Field of Classification Search ................ 701/1, 701/29; 340/438; 707/5
See application file for complete search history.

(56) References Cited

U.S. PATENT DOCUMENTS 6,009,355 A * 12/1999 Obradovich et al. ........... 701/1
2003/0236600 A1 * 12/2003 Silvester ...................... 701/29

* cited by examiner

*Primary Examiner*—Thomas Black
*Assistant Examiner*—Marie A Weiskopf

(57) ABSTRACT

Methods and an apparatus are provided for producing owners manual information related to operation of a vehicle. The apparatus comprises a display system, an input device configured to generate a control signal in response to actuation by an operator of the vehicle, and a control module that is configured to sense an event of the vehicle and generate an output signal corresponding to the event. In addition, the apparatus further comprises a display control module configured to receive the control signal generated by the input device and the output signal generated by the control module. The display control module is further configured to control the display system in order to produce a visual representation of the owners manual information related to operation of the vehicle in response to the control signal and the outputsignal.

27 Claims, 9 Drawing Sheets

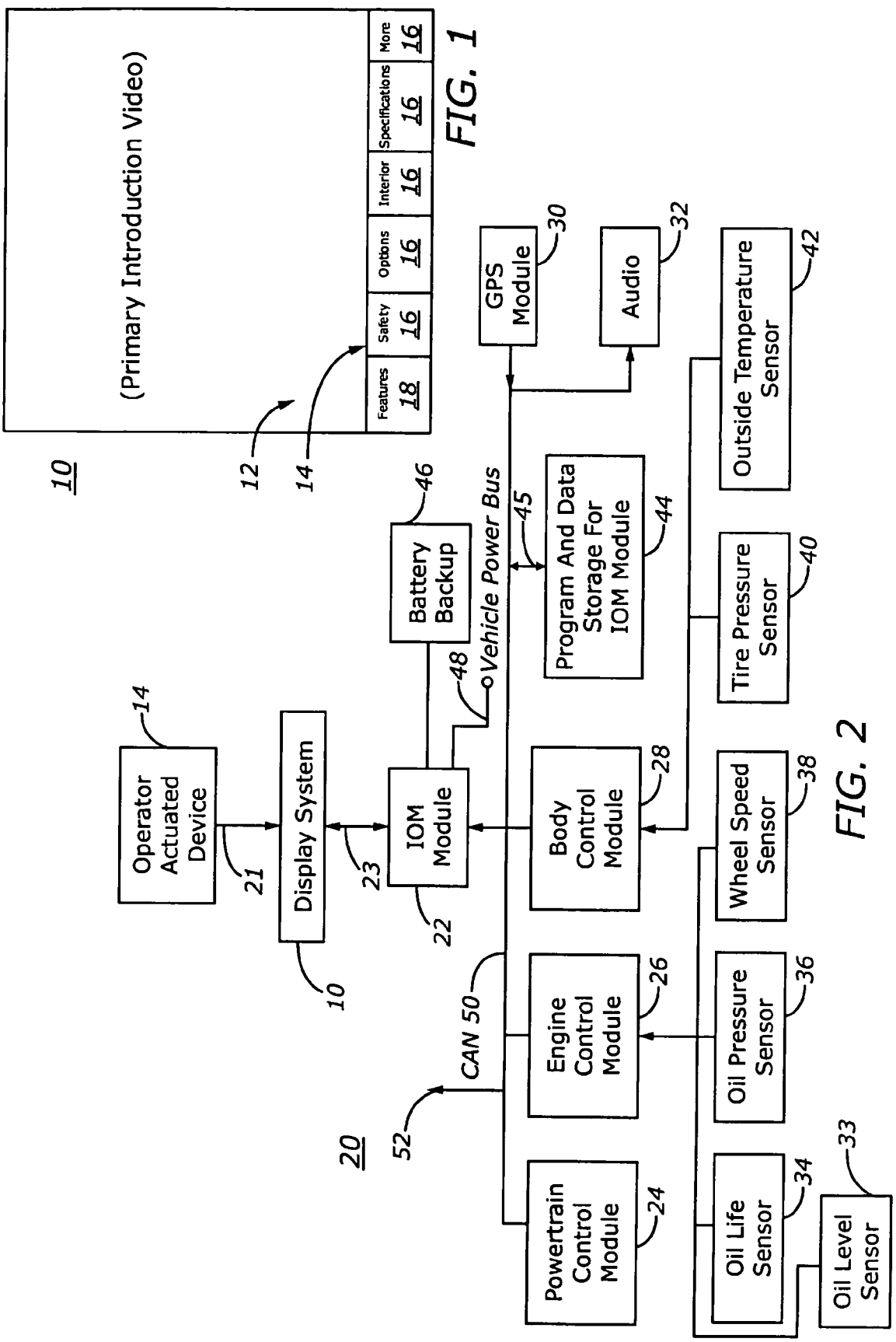

US 7,356,387 B2

APPARATUS AND METHODS FOR INTERACTIVELY DISPLAYING INFORMATION RELATING TO A VEHICLE

TECHNICAL FIELD

The present invention generally relates to electronically processing and interactively providing owners manual information related to a vehicle, and more particularly to apparatus and methods for displaying selected items of such information that have been tailored to the operation and maintenance of a specific vehicle type including the vehicle specific accessories.

BACKGROUND

Operators of vehicles (e.g., a motor or automotive vehicle) are often provided with information related to the operation and maintenance of such vehicles and the vehicle accessories. To meet this need, some vehicles include an owners manual in book form and a vehicle introduction or orientation tape suitable for being played on a video cassette recorder (VCR). Although the video cassette tape and book include useful information about the operation and maintenance of the vehicle and vehicle accessories, there are many disadvantages associated with this approach. For example, the book and video cassette tend to provide information generic to a vehicle model that is not tailored to address the particular equipment, accessories and/or options of a specific vehicle. This generic character of the book and tape can result in the user needlessly reviewing material unrelated to the equipment on the specific vehicle and unrelated to the users interest at the time. Furthermore, it is difficult and expensive for the vehicle manufacturer to provide updates to such books and tapes. Moreover, the book and video cassette are not interactive and such media does not provide real time data related to the present operation and condition of the vehicle. In addition, the video cassette and owners book often undesirably take up over half of the average glove box volume of a vehicle.

In view of the foregoing, it should be appreciated that it is desirable to provide inexpensive methods and apparatus for providing a modern replacement of the prior art owners books and video cassette orientation tapes. In particular it is desired to provide a graphical user interface (GUI) or display system for interacting with the user to display selected information related to the operation and maintenance of a vehicle including the vehicle accessories in a new, enjoyable, and meaningful way. It is also desirable for such a GUI to provide a teaching tool for vehicle sales people, drivers, potential customers and/or other vehicle users. Furthermore it is desirable for the apparatus and method to provide real-time data to the vehicle users. Furthermore it is desirable that such methods and apparatus utilize existing displays that can be readily reprogrammed as the need arises to decrease costs and provide flexibility. Additionally, it is desired to electronically provide information about the operation and maintenance of a vehicle and vehicle accessories that replaces the present-day owners manuals and video cassette tapes. Furthermore it is desired that such information be specific to the equipment of the specific vehicle and be easily updateable at locations other than the manufacturing facility. It is also desired that the owners manual information media minimize the storage of video cassette tapes and/or owners books in the vehicles to thereby free up the space therein for other uses. Furthermore, other desirable features and characteristics of the present invention will become apparent from the subsequent brief summary, detailed description, appended claims, and abstract, taken in conjunction with the accompanying drawings and the foregoing technical field and background.

BRIEF SUMMARY

An apparatus is arranged to produce owners manual information related to operation of a vehicle in accordance with an exemplary embodiment of the present invention. The apparatus comprises a display system, an input device configured to generate a control signal in response to actuation by an operator of the vehicle, and a control module that is configured to sense an event of the vehicle and generate an output signal corresponding to the event. The apparatus also comprises a display control module configured to receive the control signal generated by the input device and the output signal generated by the control module. The display control module is further configured to control the display system in order to produce a visual representation of the owners manual information related to operation of the vehicle in response to the control signal and the output signal.

In addition to the apparatus, methods for producing owners manual information related to operation of a vehicle are provided in accordance with exemplary embodiments of the present invention. The method comprising the steps of generating a control signal in response to actuation of an input device by an operator of the vehicle and generating an output signal upon sensing an event of the vehicle. In addition, the method comprises the steps of controlling a display system in order to produce a visual representation of the owners manual information related to the operation of the vehicle in response to said control signal and said output signal.

BRIEF DESCRIPTION OF THE DRAWINGS

The present invention will hereinafter be described in conjunction with the appended drawing figures, wherein like reference numbers denote like elements, and FIG. 1 is a front view of the screen of a display system having an operator actuated input device;

FIG. 2 is a block diagram of an automotive information system including the display screen of FIG. 1;

DETAILED DESCRIPTION

Figure 3:
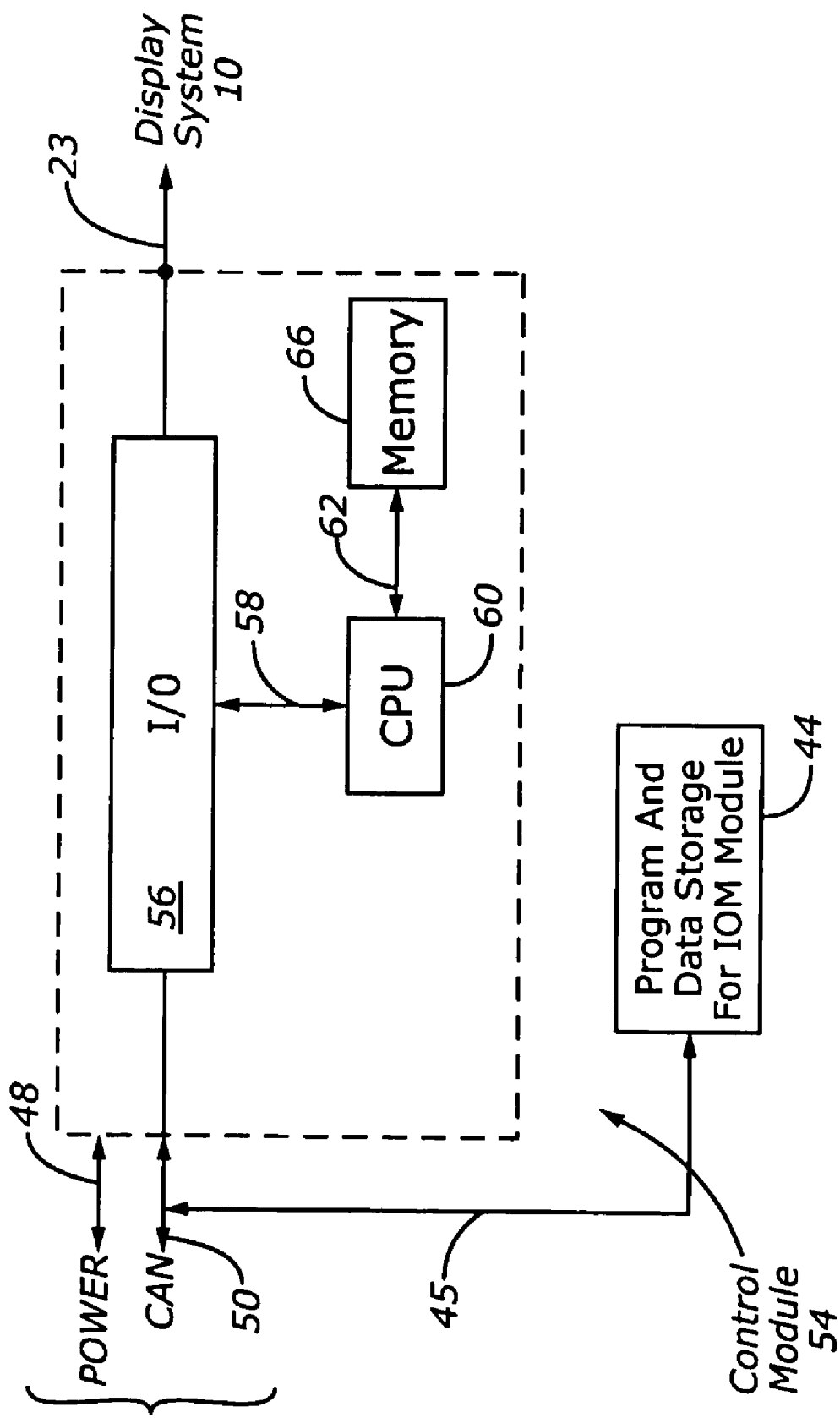
FIG. 3 is a block diagram of a display control module included in the automotive information system of FIG. 2.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Referring to FIG. 1, an Interactive Owners Manual (IOM) in accordance with an exemplary embodiment of the present invention utilizes display system 10 having a screen 12 and an operator actuated input touch screen device 14. Display system 10 provides inexpensive numerous benefits, including methods and an electronic apparatus for facilitating a modern replacement of prior art owners manuals in book form and prior art video cassette orientation tapes, for example. Interactive display system 10 can utilize the navigation system display screen commonly installed in the dashboards located in the interiors of the cabins of present day automotive vehicles or other suitable displays. Specifically, screen 12, which is utilized to display navigational information, can be also utilized to display predetermined graphical representations related to the operation and maintenance of a specific motor vehicle including the accessories for the vehicle (e.g. vehicle clock (not shown)). Such vehicle and vehicle accessories are generally well known in the art. Screen 12 includes the also well known touch screen 14 with topics such as those indicated on the screen surface areas or portions indicated by boxes 16 that can be selected by an operator touching a desired box or icon. Specific items can also be found by using an index feature. After touching, the left box 18 activates the index feature and an alphabetical keyboard is displayed in a known manner on screen 12, for example. The operator then types in a key word and the display system 10 brings up on screen 12 topics based on the key word. The operator then can select the topic of interest. The image on screen 12 as shown FIG. 1 is an example indicating that a primary introduction video relating to the vehicle is available for display. A displayed image remains until either screen 12 is touched again or the display system 10 is turned off.

FIG. 2 is a block diagram of an automotive information system 20 including the display system 10 and the operator actuated input device 14 of FIG. 1. Device 14 provides control signals to display system 10 on conductor 21. A display control module or Interactive Owners Manual Module (IOMM) 22 is preferably connected to display system 10 by two way conductor 23. IOMM is also coupled to vehicle control modules powertrain control module 24, engine control module 26, body control module 28 and a Global Positioning System (GPS) module 30. For instance, GPS module 30 can be included in either an onboard navigation system or an OnStar® system, both of which have configurations and functions that are all well known in the art. Audio subsystem 32 is connected to control the broadcast of audio files through the sound system of the vehicle. Oil life sensor 34, oil pressure sensor 36 and wheel speed sensor 38 are all connected to engine control module 26 and provide output signals corresponding to the events monitored by the sensors. Moreover, tire pressure sensor 40 and outside temperature sensor 42 are connected to body control module 28 and provide output signals in response to the events monitored by such sensors.

Programs and data storage for IOMM 22 is provided by memory module 44. Memory module 44 can include memory components such as Read Only Memory (ROM) and/or Random Access Memory (RAM) of known configurations for storing both data and software operating programs for IOMM 22 and the other subsystems of information system 20. Battery backup subsystem bus 46 and vehicle power bus 48 are connected to IOMM 22. Battery back up 46 provides power to IOMM 22 and associated subsystems such as memory 44 if the main source of vehicle electrical power fails. Such backup facilitates the display on screen 12 of how to open the vehicle hood and/or how to jump-start the vehicle in the case of main battery failure, for example.

Controller Area Network (CAN) 50 interconnects the vehicle control modules 24, 26, 28, and 30 with audio module 32, memory module 44 and IOMM 22 so that signals and data can be appropriately shared between these subsystems in a known manner. Specifically, two-way conductor 45 enables storage or memory module 44 to receive and store data and to download programs applied to CAN input terminal 52 by a program transfer device of FIG. 4. Conductor 45 also enables storage module 44 to store other data conducted by CAN bus 50 from control modules 24, 26, 28, and 30, for example. Moreover, storage module 44 utilizes CAN bus 50 to provide both data and program control signals to IOMM 22.

FIG. 3 is a block diagram of the display controller module 54 that is included in IOMM 22 of the automotive information system 20 of FIG. 2. Electrical power is applied to module 54 by power bus 48. CAN bus 50 is connected to Input/Output (I/O) circuit 56. I/O 56 couples Central Processing Unit (CPU) 60 of module 54 through CAN 50 so that controller module 54 can receive input signals from memory module 44, vehicle control modules 24, 26, 28 and 30 and audio subsystem module 32, for instance. CPU 60 includes one or more microprocessors or microcontrollers of known configurations. CPU 60 exchanges data on two-way conductor 62 with memory 66, which can include RAM and ROM components, and through two way conductor 58 and I/O 56 with IOM memory 44. CPU 60 responds to input signals from I/O 56 to provide output signals through I/O 56 and output conductor 23 for operating display system 10. Screen 12 is operated by system 10 under the direction of controller 60 to provide the predetermined graphical representations for viewing by an operator of vehicle information system 20.

Figure 4:
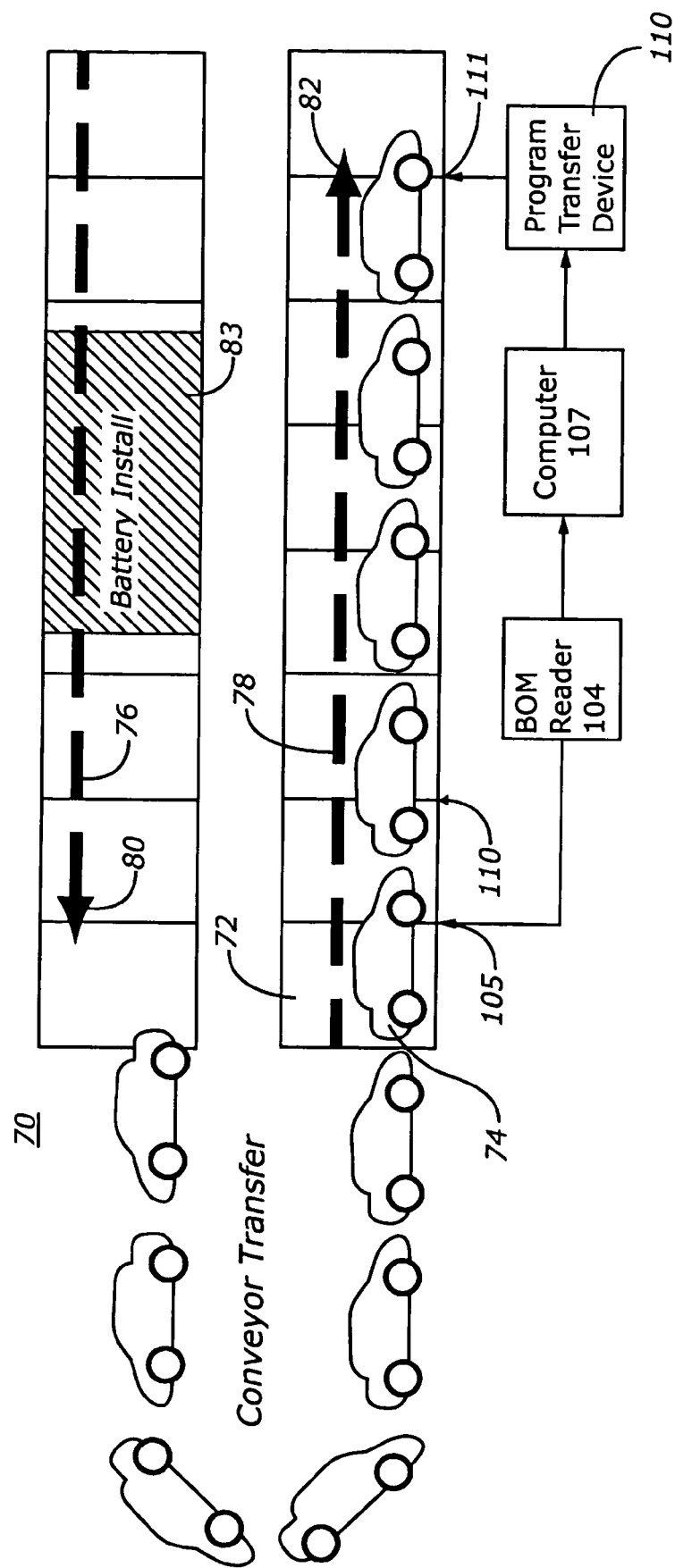
FIG. 4 is a diagrammatic view of an assembly line having apparatuses arranged to download programs to the memory module of the automotive information system of FIG. 2.

Referring to FIG. 4, a diagrammatic view is shown of a vehicle assembly line 70 of an automotive vehicle assembly plant. Line 70 has a number of work spaces, such as physical space 72, each arranged to facilitate the performance of assigned tasks related to the manufacture of a vehicle, such as vehicle 74, which can be an automobile, truck or sports utility vehicle, for instance. Dashed lines 76 and 78 and respective arrowheads 80 and 82 indicate the direction of the workflow through the assembly line spaces. For example, one of the manufacturing steps includes the installation of a battery in space 83. Other steps involve the performance of the software programming method 100 of FIG. 5 of IOM memory module 44 included in information system 20 that is installed in each of the vehicles, such as vehicle 74. A readable Bill Of Materials (BOM) is included on each vehicle, such as vehicle 74, in a known manner. The BOM lists the specific equipment, including the accessories of the associated vehicle.

Figure 5:
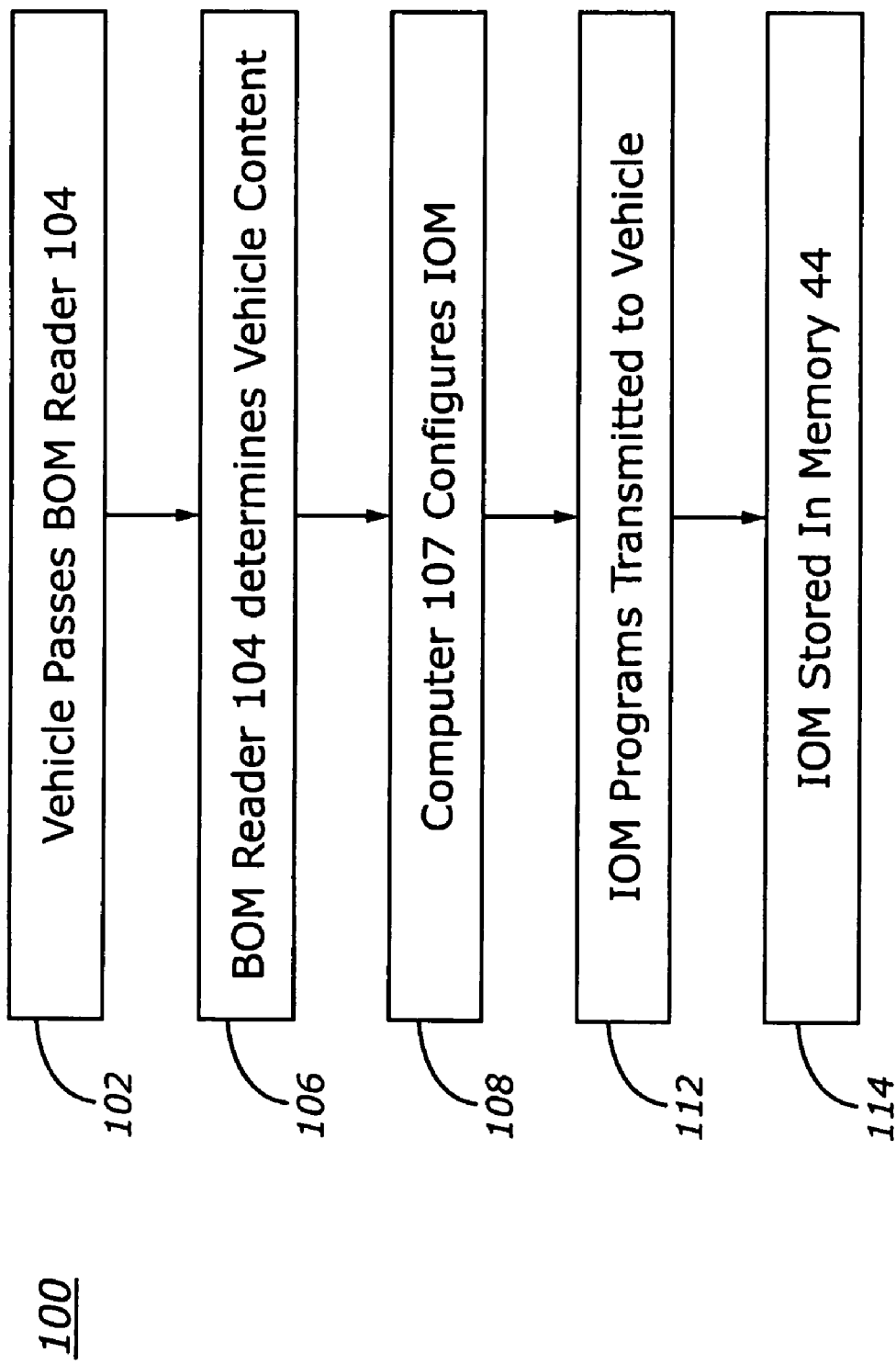
FIG. 5 is a flow chart of a method for downloading programs to a memory module of the automotive information system of FIG. 2.

Referring to step 102 of method 100, as shown in FIG. 5, the BOM is read as vehicle 74 of FIG. 4 passes the input of BOM reader 104 located at point 105 of space 72. In accordance with step 106, BOM reader 104 determines and stores the predetermined content and the interior trim level of the vehicle 74, including the accessories thereof. Computer 107 then configures the IOMM 22 and memory module 44 of vehicle 74 per step 108 to conform to the specific equipment of vehicle 74. Program transfer device 110 transmits the IOM programs per step 112 into memory 44 when vehicle 74 passes point 111 of assembly line 70, for example. Transfer device 110 can download the programs through either a cable connection to the diagnostic port of a vehicle, via a Radio Frequency (RF) link or other communication link, which can be received at the input terminal 52 of CAN 50 of FIG. 2. The download step 112 provides the programs that are stored by memory module 44 per step 114. Programs and/or data related to items, components or accessories installed later on a vehicle can be added to a memory 44 of the vehicle at a location other than the manufacturing facility (e.g. vehicle dealership) through terminal 52 at the time of installation.

Figure 6:
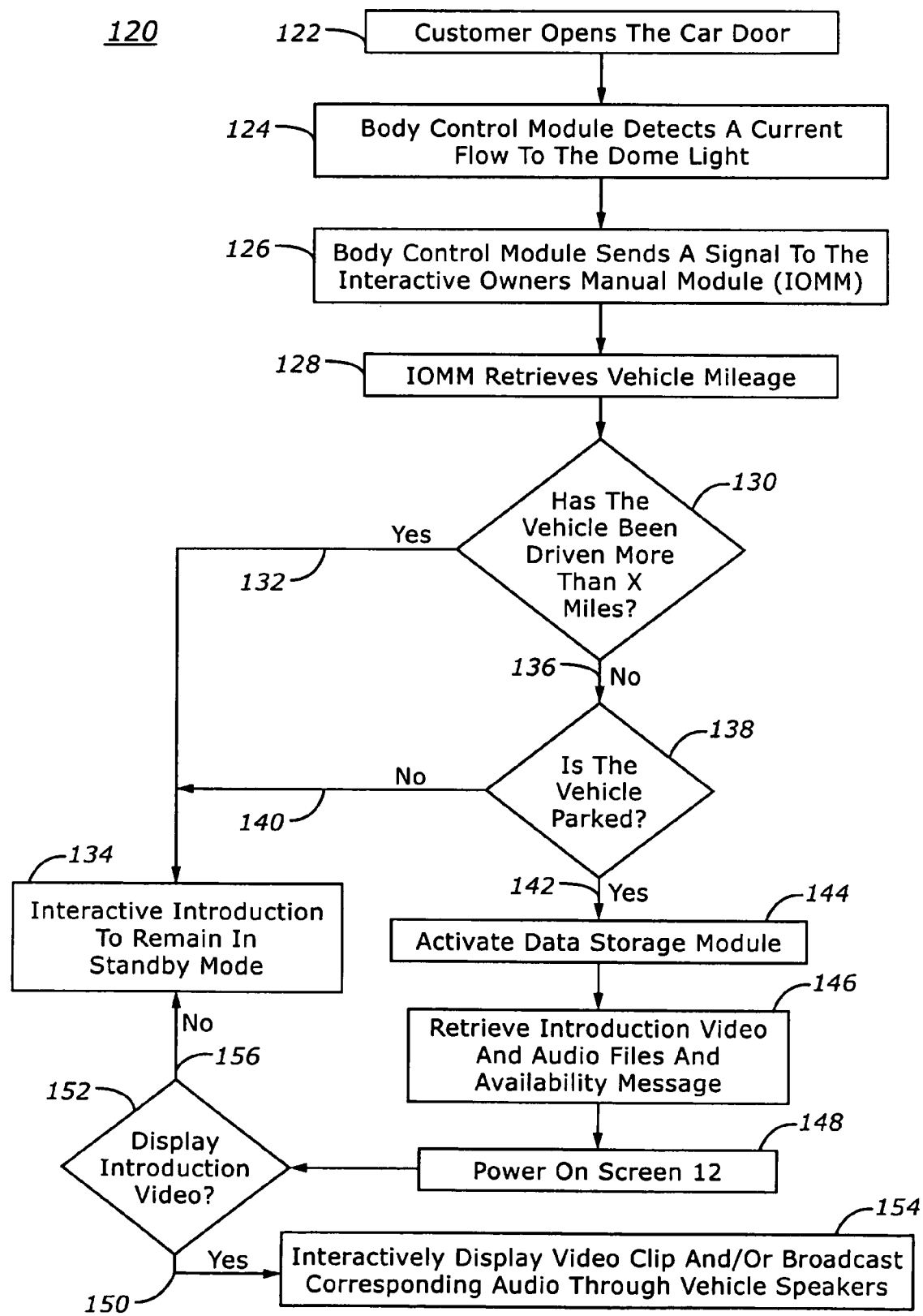
FIG. 6 is a flow chart of a method for providing graphical representations relating to the display of a video file and the broadcast of an audio file.

The following methods to be described herein are performed under the direction of the controller 60 of FIG. 3 in accordance with the software programs and data stored in memory module 44 of IOMM 22. Each method is individually actuated in response to an interrupt routine in a known manner. FIG. 6 is a flow chart of a method 120 for initiating the display on screen 10 of an introductory video file for a vehicle that is stored in memory 44 along with the broadcast of an audio file under the control of audio subsystem 32. A vehicle door being opened per step 122 activates a door jam switch, which in turn conducts a current that provides vehicle interior lighting. This current flow also signals the body control module 28 of FIG. 2 that a door has been opened per step 124. Module 28 then sends a signal to direct IOMM 22 per step 126 to retrieve the vehicle mileage from powertrain module 24 per step 128. The IOMM 22 provides the Yes control signal indicated by decision line 132 if the number of miles traveled by the vehicle is more than a predetermined threshold "X" such as 25 miles. The Yes indicates that the mileage is more than an expected showroom level. The Yes signal causes the controller 60 to direct that the display of the interactive vehicle introduction video remains in a standby mode as indicated by step 134. Alternatively, a No signal of decision line 136 from IOMM 22 is provided by controller 60 if the number of miles traveled by the vehicle is less than the predetermined threshold which indicates that the mileage is less than an expected showroom level. Preferably, the dealer can change this threshold mileage.

The IOMM 22 then determines whether the vehicle is in a predetermined operating mode, such as in a parked mode. For instance, in a vehicle with an automatic transmission, the transmission status is retrieved from the module 24 to determine if the transmission is in predetermined "park" position per step 138. Alternatively, if the vehicle has a manual transmission then the setting of the parking brake can provide a signal that the vehicle is parked per step 138, for example. If the vehicle is not parked then module 24 provides the No output signal indicated by decision line 140 to continue the standby mode for method 120 of step 134. Alternatively, if the transmission is in park then module 24 provides the Yes output signal indicated by decision line 142 to activate the data storage module 44 per step 144. The storage module 44 then enables IOMM 22 to retrieve the video, audio and "video availability message" files in accordance with step 146. The screen 12 is then powered per step 148 and provides the message to the user or customer that the video is available. The user can then utilize touch screen feature 14 to choose or select whether to play the video and/or broadcast the sound. A sound mute touch control area can also be provided on screen 12 to allow only the video to be played. A selection to play provides the Yes decision line 150 of step 152 that operates controller 60 to direct IOMM 22 of system 10 to display the video clip on screen 12 and/or the audio to be broadcasted through the vehicle speakers in accordance with step 154. Alternatively, the user can choose to not have the introduction displayed as indicated by the No decision line 156 and the interactive introduction will then remain in the standby mode per step 134. The introductory video and/or audio can also be enabled at any time the vehicle is parked through the IOM function at the request of an operator or customer.

Figure 7:
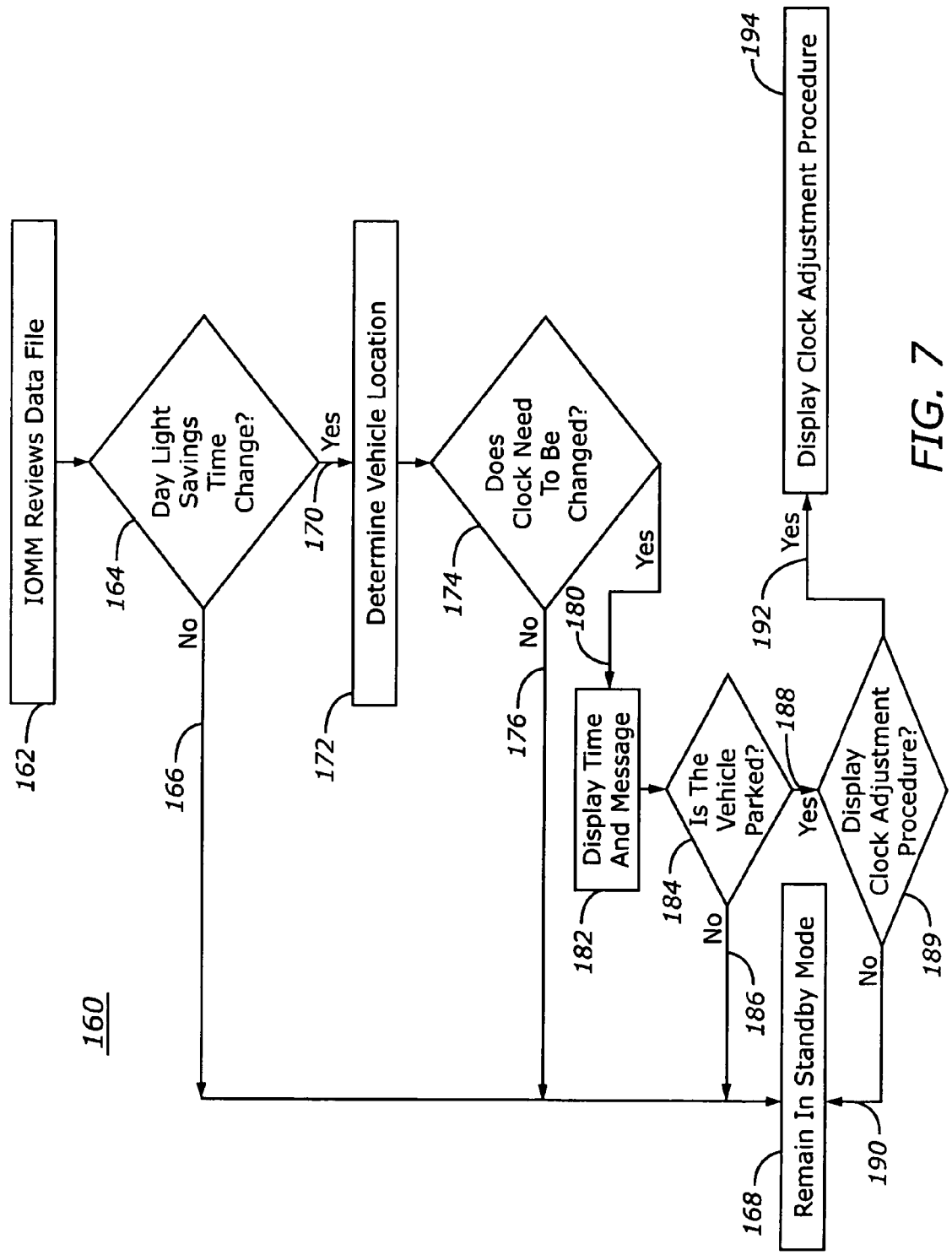
FIG. 7 is flow chart of a method related to initiating the display of a procedure for adjusting a vehicle clock to reflect a change in the time of day caused by a daylight savings time change.

FIG. 7 shows the flow chart of a method 160 relating to providing the display of a procedure for adjusting a vehicle clock, which is one example of numerous vehicle accessories to reflect a change in the time of day in response to a daylight savings time change. In accordance with step 162, IOMM retrieves and reviews the time of day and the date data files from GPS module 30 of FIG. 2 so that processor 60 can determine whether the time of day has changed because of a day light savings time change per step 164. Such change can occur on the two days a year when the time shown by clocks of some states or geographical areas are adjusted to daylight savings time. If step 164 determines the time has not changed then decision step 164 provides a No as indicated by line 166 and method 160 remains in a standby mode as indicated by step 168. Alternatively, if the time has changed then a Yes is provided by processor 60 per step 164 as indicated by line 170, which results in the location of the vehicle being determined per step 172 from data provided by GPS module 30.

Processor 60 compares this location data with the data of a data base stored in memory 44 of the states or areas that have daylight savings time changes to identify in step 174 whether the clock need to be changed. If the answer is No as indicated by line 176 then the method 160 remains in the standby mode. On the other hand, if the answer is Yes as indicated by line 180 then the time and a message recommending a time change is provided per step 182 on display 112.

Decision block 184 then determines whether vehicle is parked as previously described for step 138 of FIG. 6, for instance. If the answer is No as indicated by line 186 then method 160 remains in the standby mode as indicated by step 168. However, if the vehicle is parked the Yes on line 188 causes a query on the display screen 12 as to whether to display the clock adjustment procedure per decision step 189. If the answer selected by the user is No as indicated by line 190 then method 160 remains in the standby mode. But if the answer is Yes as indicated by decision line 192 then the clock adjustment procedure portion of the electronic owners manual pertaining to adjusting the clock is displayed per step 194. Display 12 as directed by processor 60 then guides the user through the steps to be performed by the user to make the desired day light savings time adjustment.

Figure 8:
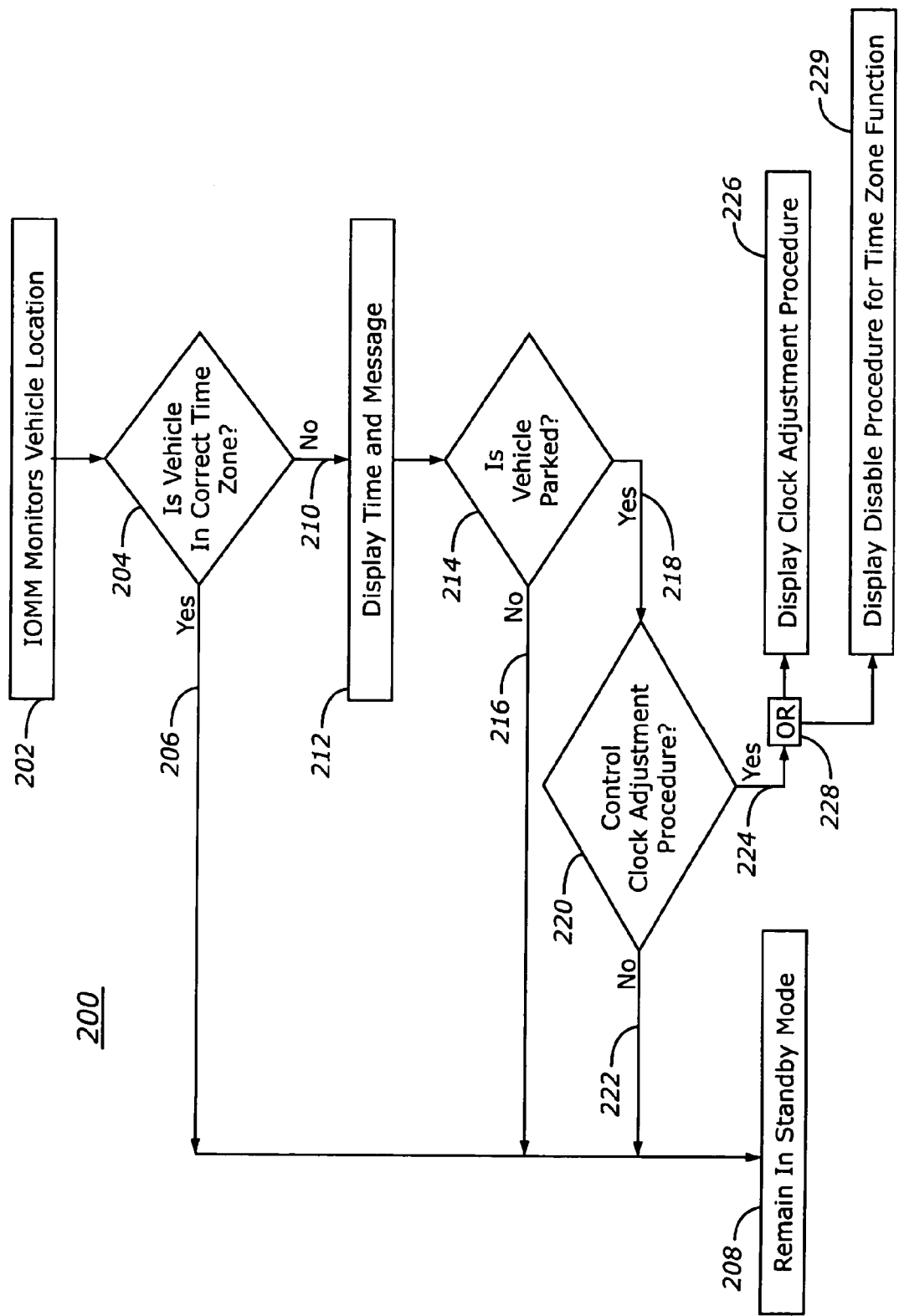
FIG. 8 is flow chart of a method related to initiating a display of a procedure for adjusting a vehicle clock to reflect a change in the time of day caused by the vehicle traveling into a different time zone.

FIG. 8 shows a flow chart of a method 200 related to displaying a procedure for adjusting a vehicle clock to reflect a change in the time of day caused by the vehicle traveling into a different time zone. GPS module 30 determines and provides vehicle location and time of day data to IOMM 22 per step 202. Processor 60 determines whether the vehicle is in the correct or determined time zone. If the answer is Yes then the method 200 remains in the standby mode as indicated by decision line 206 and step 208.

However, if the vehicle moves out of the correct time zone then a No is provided as indicated by decision line 210. Per step 212, the driver is notified of the change in time zone by a display on screen 12. Next decision step 214 determines whether the vehicle is parked as previously described with respect to step 138 of FIG. 6, for instance. If the vehicle is not parked then a No is indicated by line 216 and the method 200 remains in the standby mode. On the other hand if the transmission is in park, for example, the Yes of line 218 is provided and processor 60 directs display 12 to query whether the driver wants to control the clock adjustment procedure per step 220. If the driver chooses to control the procedure then the No decision on line 222 causes method 200 to remain in the standby mode. Alternatively, a Yes decision 224 provides the driver with two choices. The driver can choose to cause processor 60 to have screen 12 display the portion of the owner manual pertaining to a clock adjustment procedure of step 226. Alternatively per "Or" step 228 the driver can choose to disable the time zone function per step 229 if the driver desires to not be notified when the vehicle changes time zones. For instance, a driver may choose to disable the time zone function if the vehicle frequently is driven into different time zones such as to and from work.

Figure 9:
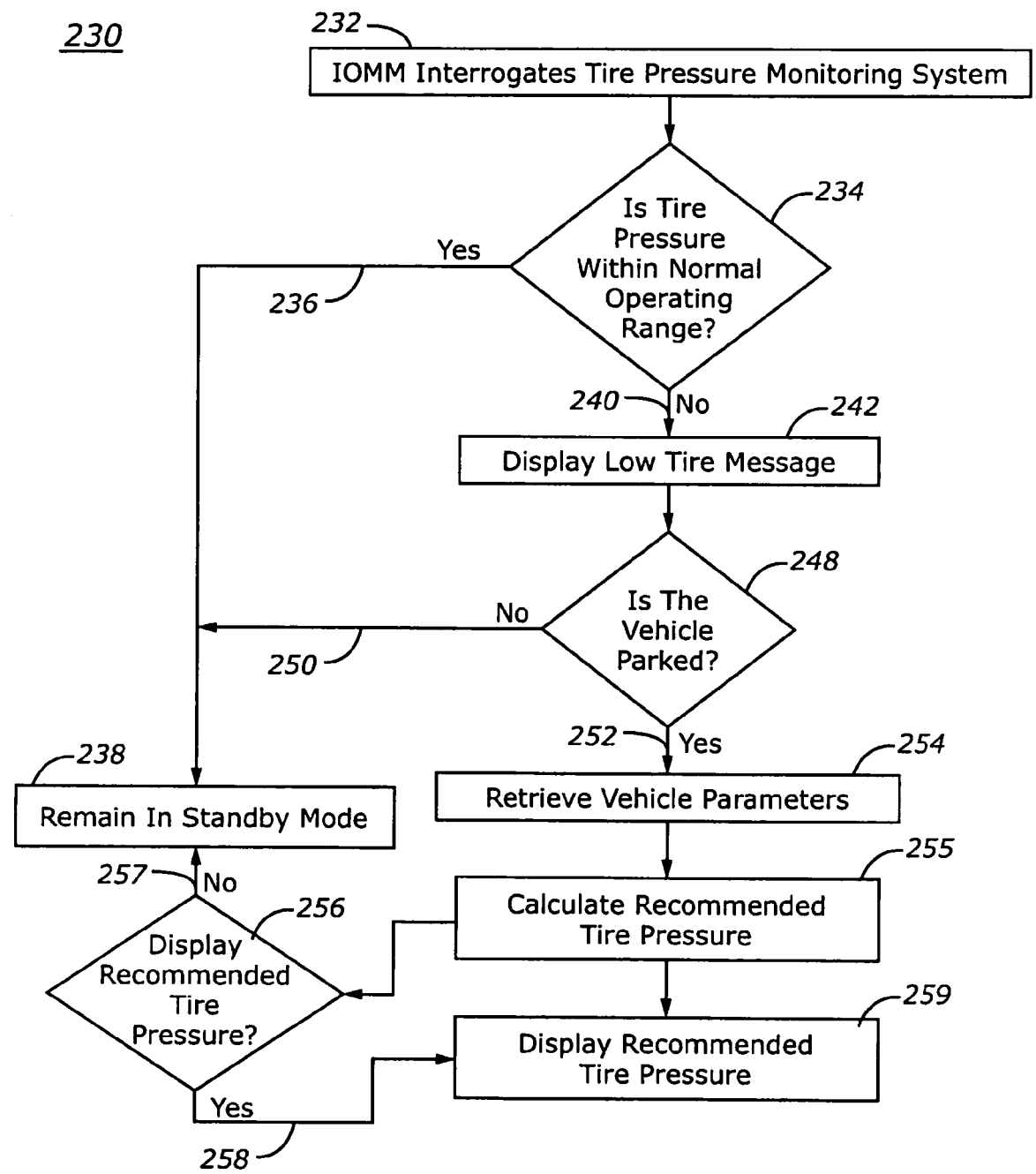
FIG. 9 is flow chart of a method related to initiating graphical representations relating to the display of a recommended vehicle tire air pressure.

FIG. 9 is a flow chart of a method 230 for providing graphical representations relating to the display of a recommended vehicle tire air pressure. Per step 232, the IOMM 22 monitors the air pressure of the tires of the vehicle utilizing tire pressure sensor 40 of FIG. 2. Decision step 234 determines whether the tire pressure is within a normal operating range. If the pressure is within the normal range then the Yes on line 236 causes method 230 to remain in the standby mode per step 238. If the pressure is not within the normal range, then the No of line 240 causes the display of a low tire message in accordance with step 242. Decision step 248 then determines whether the vehicle is parked in the manner previously described with respect to step 138 of FIG. 6. If the vehicle is not parked then the No on decision line 250 again instructs method 230 to remain in the standby mode per step 238.

If the vehicle is parked then the Yes of line 252 instructs controller 60 to retrieve per step 254 the parameters from the vehicle control modules such as modules 26 and 28 from memory 44 necessary to enable the calculation of a recommended tire pressure per step 255, using any number of equations such as the following equation:

$$T=T(r)\times((T(a)-70° \text{ F.})\times T(c))+(t\times t(c))+(V(a)\times V(c)) \quad (1)$$

Where T is the recommended tire pressure, T(a) is the ambient temperature, V(a) is the average speed, t(c) is the time coefficient, T(r) recommended cold tire pressure, t is the time driven, V(c) is the speed coefficient, and T(c) is the temperature coefficient. T(c), t(c) and V(c) can be determined through testing and stored in tabular or equation form in memory 44. Even if the vehicle is not equipped with a tire pressure monitoring system, the results of the recommended tire pressure calculation can still be accessed through the interactive IOM touch screen feature 14. Next per step 256, method 230 inquires whether the operator desires to display the recommended tire pressure. A No response of line 257 causes the method 230 to remain in the standby mode per step 238. A Yes response per line 258 causes controller 60 to instruct display system 10 to display the recommended tire pressure (T) per step 259.

Figure 10:
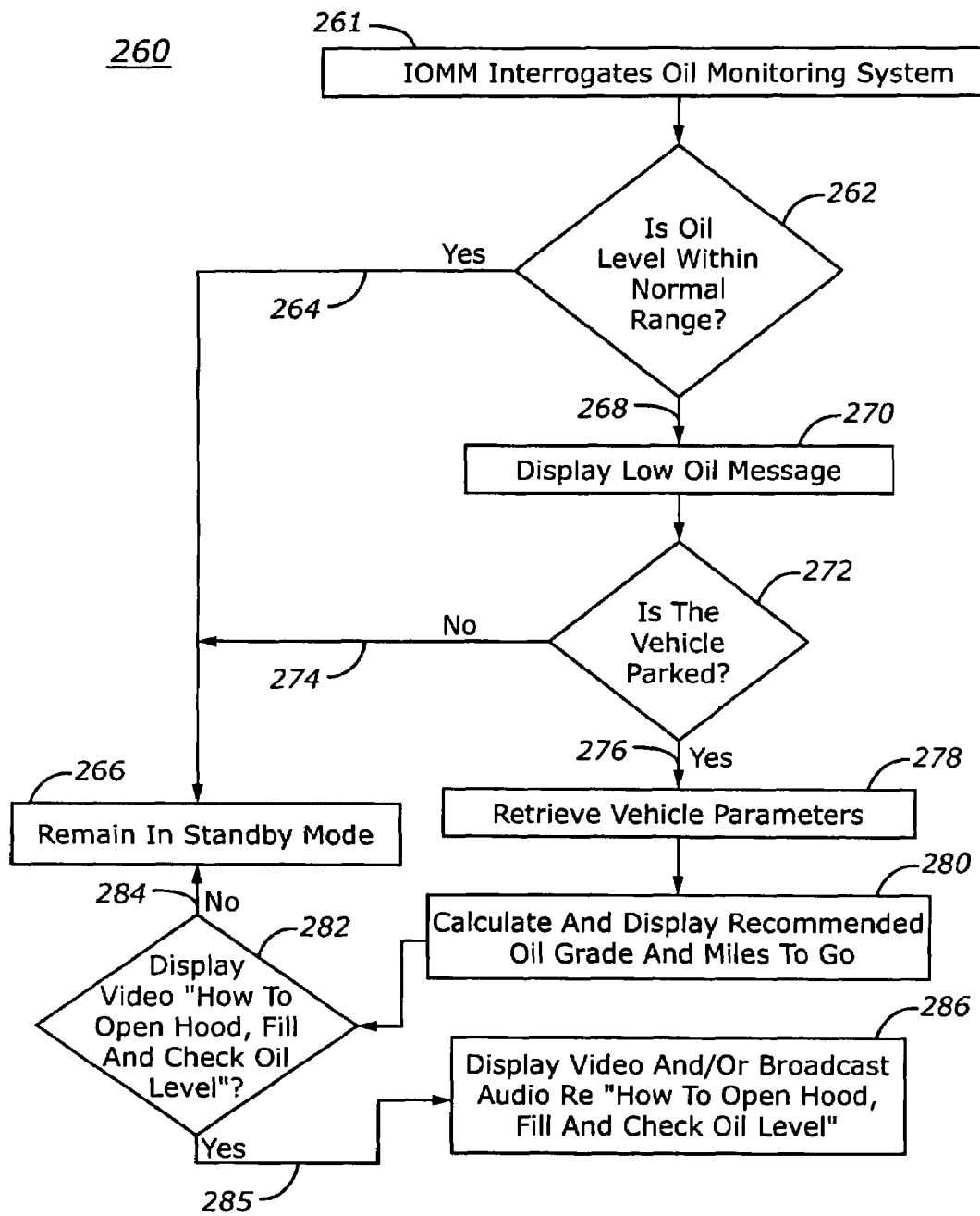
FIG. 10 is flow chart of a method for enabling graphical representations relating to the display of a recommended grade for the oil lubricating the power source of a vehicle.

FIG. 10 is a flow chart of a method 260 for providing graphical representations relating to the display of a recommended grade for the oil lubricating the power source such as the internal combustion engine or an electric motor of a vehicle. The representations can also relate to how to fill and check the oil level. Per step 261 controller 60 interrogates the oil monitoring system of the vehicle. By collecting data from oil level sensor 33 IOMM 22 determines whether the lubricating oil level is within normal limits per step 262. The Yes of line 264 indicates that the oil level is within normal range and method 260 remains in the standby mode per step 266. The No of line 268 causes the display of a low oil message per step 270.

Next per step 272, module 24 then determines whether the vehicle is parked as previously explained with respect to step 138 of FIG. 6. A No indicated by decision line 274 causes the standby mode to continue per step 266. A Yes per line 276 causes retrieval per step 278 of vehicle parameters related to ambient temperature and average driving conditions, for instance. This information is used by controller 60 to calculate per step 280 the correct oil viscosity in a known manner. The oil viscosity recommendation can be either calculated or retrieved from data stored in tabular form in memory 44. IOMM 22 can also evaluate the oil life, and if the oil is near the end of its life, the IOMM 22 can utilize controller 60 to calculate and direct the display of the estimated number of miles left per step 280 along with the recommended oil viscosity or grade. This display can allow the driver to decide whether to either add oil to the power source for the vehicle or to change oil early. The driver can then choose per decision step 282 whether to display a video on how to open the hood, and fill and check to oil level. If the decision is No per line 284 then the standby mode for method 260 is maintained per step 266. If the decision is Yes per line 285 then the video file along with any accompanying audio file, if desired, is retrieved from memory 44 under the direction of controller 60 and displayed on screen 12 per step 286. The audio file can be broadcasted through the audio system of the vehicle.

Thus several example methods 100, 120, 160, 200, 230 and 260 and electronic apparatus 20 for providing a modern replacement for the prior art book type of owners manuals and the video cassette tapes have been described. In particular these methods and apparatus provide a (GUI) or display system 10 for interacting with the user to display selected information on screen 12 related to the operation and maintenance of a motorized vehicle including the accessories thereof in a new, enjoyable and meaningful way. Automotive information system 20 provides a teaching tool for vehicle sales people, drivers, potential customers and other vehicle users. Furthermore, the apparatus and methods provide real time data on screen 12 to the users. Such methods and apparatus require only minimal changes in the other portions of the overall vehicle system. Changes such as either wiring changes or the redesigns of the vehicle and the expenses associated therewith are substantially avoided by system 20. For instance, the described apparatus and methods utilize the already existing navigation display and includes a memory 44 that can be readily reprogrammed as the need arises to decrease costs and provide flexibility. The disclosed interactive electronic media utilizes touch screen feature 14. The electronic manual of the apparatus and method replaces the present day owners books and VCR tapes and provides the information about the operation and maintenance of the vehicle and accessories that is specific to the equipment of the vehicle. Such information is easily updateable by either the vehicle manufacturer or a dealer, for example. This electronic apparatus enables the removal of the prior art video cassette tapes and/or owners books from vehicles to free up the space therein for other uses while the electronic owners manual remains with the vehicle so that it is available when needed.

While at least one exemplary embodiment has been presented in the foregoing detailed description, it should be appreciated that a vast number of variations exist. It should also be appreciated that these exemplary embodiments are only examples, and are not intended to limit the scope, applicability, or configuration of the invention in any way. Rather, the foregoing detailed description provides those skilled in the art with a convenient road map for implementing an exemplary embodiment of the invention. It being understood that various changes may be made in the function and arrangement of elements described in any exemplary embodiment without departing from the spirit and scope of the invention as set forth in the appended claims and the legal equivalents thereof.

What is claimed is:

1. An apparatus arranged to produce owners manual information related to operation of a vehicle, comprising:
   a display system;
   an input device that is configured to generate a first control signal in response to actuation by an operator of the vehicle;
   a control module that is configured to sense a first event and a second event of the vehicle and generate a first output signal corresponding to said first event and generate a second output signal corresponding to said second event; and
   a display control module that is configured to receive said first control signal generated by said input device and said first and second output signals generated by said control module, said display control module further configured to control said display system to produce a visual representation of the owners manual information related to operation of the vehicle in response to said first control signal and said first and second output signals.

2. The apparatus of claim 1, wherein said display system has a surface and said input device is a touch screen associated with said surface.

3. The apparatus of claim 1, wherein said display control module comprises at least one microprocessor.

4. The apparatus of claim 1, wherein the visual representation of the owners manual information related to operation of the vehicle is vehicle specific information and the apparatus further comprising a system that is configured to receive said vehicle specific owners manual information and produce the vehicle specific owners manual information in response to said control signal and said output signal.

5. The apparatus of claim 1, farther comprising an audio system that is configured to produce an audio representation of the owners manual information related to operation of the vehicle in response to said first control signal and said first output signal.

6. The apparatus of claim 1, wherein said first event is an opening of a door of the vehicle and said second event is a number of miles traveled by the vehicle less than a predetermine threshold.

7. The apparatus of claim 1, wherein said control module is further configured to sense a third event of the vehicle and generate a third output signal corresponding to said third event and said display control module is farther configured to receive said third output signal generated by said control module and control said display system to produce said visual representation of information related to operation of the vehicle in response to said third output signal.

8. The apparatus of claim 7, wherein said third event is a transmission of the vehicle in a predetermined transmission configuration.

9. The apparatus of claim 1, wherein said information related to operation of the vehicle is information related to adjustment of a vehicle clock.

10. The apparatus of claim 1, wherein said first output signal corresponds to identification of a location of the vehicle and said display control module is configured to control said display in order to produce said visual representation of the owners manual information related to adjustment of said vehicle clock when the output signal indicates a time zone change.

11. The apparatus of claim 1, wherein the owners manual information related to operation of the vehicle is information related to tire pressure of the vehicle and said first event is sensing said tire pressure.

12. The apparatus of claim 1, wherein said first control signal is generated in response to actuation of the input device to select of a tire pressure.

13. The apparatus of claim 1, wherein the owners manual information related to operation of the vehicle is information related to lubricating an engine of the vehicle.

14. A method for producing owners manual information related to operation of a vehicle, comprising the steps of:
   generating a first control signal in response to actuation of an input device by an operator of the vehicle;
   generating a first output signal corresponding to a first event of the vehicle;
   generating a second output signal corresponding to a second event of the vehicle; and
   controlling a display system to produce a visual representation of the owners manual information related to said operation of the vehicle in response to said first control signal and said first and second output signals.

15. The method of claim 14, wherein said display system has a surface and said input device is a touch screen associated with said surface.

16. The method of claim 14, wherein the visual representation of the owners manual information related to operation of the vehicle is vehicle specific information and the method further comprises the steps of controlling said display system in order to produce said vehicle specific information in response to said first control signal and said first output signal.

17. The method of claim 14, further comprising the steps of controlling an audio system in order to produce an audio representation of the owners manual information related to operation of the vehicle in response to said first control signal and said first output signal.

18. The method of claim 14, wherein said first event is an opening of a door of the vehicle and said second event is a number of miles traveled by the vehicle less than a predetermine threshold.

19. The method of claim 14, further comprising the steps of generating a third output signal corresponding to said a third event and controlling said display said display system to produce said visual representation of the owners manual information related to operation of the vehicle in response to said third output signal.

20. The method of claim 19, wherein said third event is a transmission of the vehicle in a predetermined transmission configuration.

21. The method of claim 14, wherein the owners manual information related to operation of the vehicle is information related to adjustment of a vehicle clock.

22. The method of claim 14, wherein said first output signal corresponds to identification of a location of the vehicle.

23. The method of claim 14, wherein the owners manual information related to operation of the vehicle is information related to tire pressure of the vehicle and said first event is sensing said tire pressure.

24. The method of claim 14, wherein said generating said first control signal is conducted in response to actuation of the input device to select of a tire pressure.

25. The method of claim 14, wherein the owners manual information related to operation of the vehicle is information related to lubricating an engine of the vehicle.

26. A method for creating an owners manual for a particular motor vehicle including a computing device having memory, comprising the steps of:

determining specific features of the particular motor vehicle;

selecting owners manual information based on the determined specific features; and transferring the selected owners manual information into the memory.

27. The method of claim 26, wherein the determining step comprises the step of reading a bill of materials to determine the specific features for the particular motor vehicle.

* * * * *